United States Patent [19]

Mekelburg

[11] 4,162,149

[45] Jul. 24, 1979

[54] GRAVEL AND DUST SEPARATOR AND CONTAINER FOR VACUUM CLEANING SYSTEMS

[76] Inventor: Clayton G. Mekelburg, 2609 S. Raritan, Englewood, Colo. 80110

[21] Appl. No.: 866,809

[22] Filed: Jan. 3, 1978

[51] Int. Cl.² .......................... B01D 50/00; A47L 9/16
[52] U.S. Cl. ....................................... 55/315; 55/319; 55/349; 55/356; 55/432; 55/DIG. 3; 15/352; 15/353
[58] Field of Search ................. 55/319, 345, 349, 356, 55/358, 432, 433, DIG. 3, 315, 318; 15/340, 347, 352, 353; 209/144

[56] References Cited

U.S. PATENT DOCUMENTS

| | | | |
|---|---|---|---|
| 2,760,595 | 8/1956 | Pynor | 55/432 |
| 2,780,502 | 12/1973 | Dupre et al. | 55/356 |
| 2,966,232 | 12/1960 | Austin | 55/345 |
| 3,257,798 | 6/1966 | Hass | 55/345 |
| 3,404,776 | 10/1968 | Shaddock | 55/314 |
| 3,421,666 | 1/1969 | Lawson | 55/432 |
| 3,608,283 | 9/1971 | Huglo | 55/356 |
| 3,842,461 | 10/1974 | Wurster | 55/319 |
| 3,870,489 | 3/1975 | Shaddock | 55/319 |
| 3,955,236 | 5/1976 | Mekelburg | 55/319 |

FOREIGN PATENT DOCUMENTS

| | | | |
|---|---|---|---|
| 379989 | 4/1940 | Italy | 55/319 |
| 535360 | 4/1941 | United Kingdom | 55/319 |

Primary Examiner—Frank W. Lutter
Assistant Examiner—David L. Lacey
Attorney, Agent, or Firm—Richard D. Law

[57] ABSTRACT

An enclosed portable container for gravel and dust in a vacuum cleaning system, provided with at least two cyclone air cleaners, having a clean out door, and each cyclone is provided with its own clean out door, is skid mounted for pick up and carry to dumping areas, reducing the handling of collected dirt, gravel and dust. The separate air pump assembly provides motivating power for the vacuum cleaning system.

7 Claims, 8 Drawing Figures

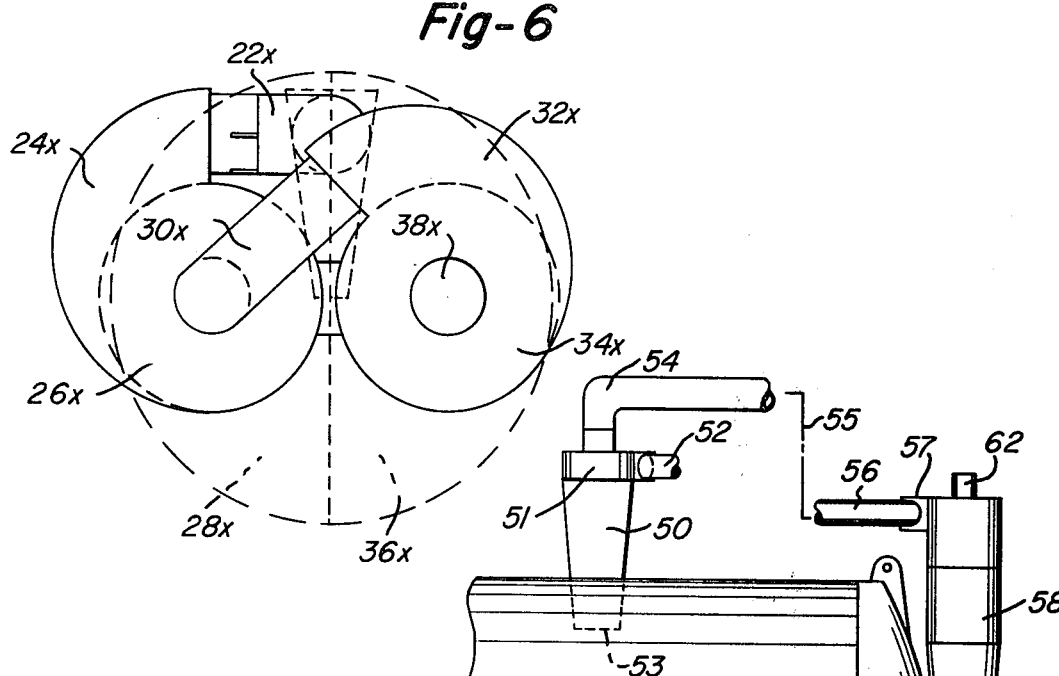
Fig-6
Fig-7
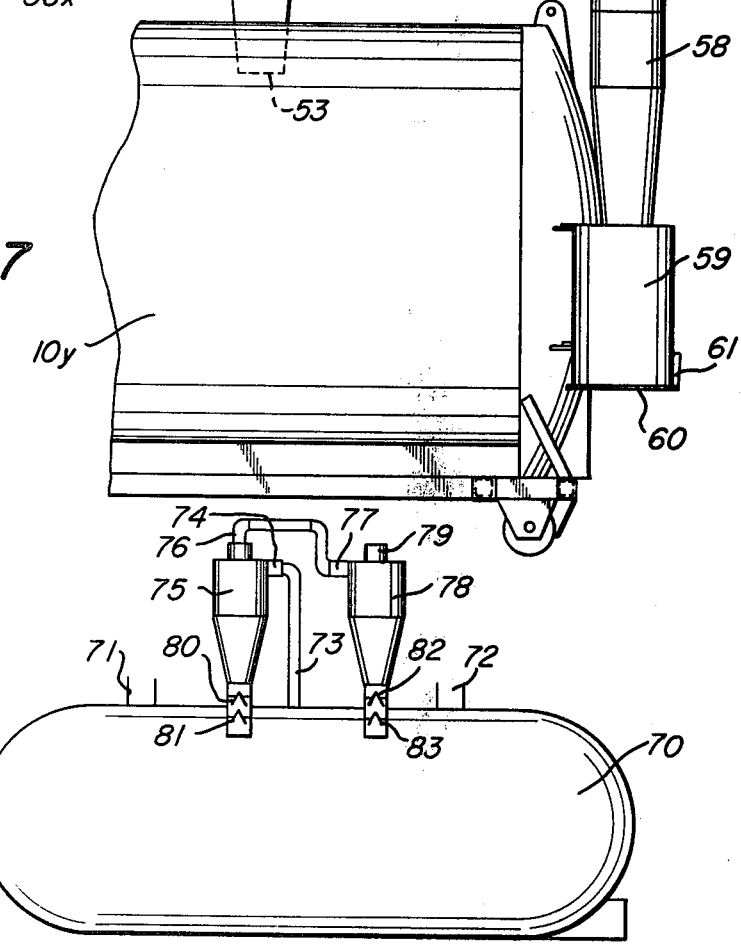
Fig-8

GRAVEL AND DUST SEPARATOR AND CONTAINER FOR VACUUM CLEANING SYSTEMS

BACKGROUND OF THE INVENTION

Vacuum cleaning systems for large remote areas (such as flat roofs) have been proposed in the art, and generally such equipment is exemplified by many patents. Such patents as U.S. Pat. No. 3,955,236, dated May 11, 1976; U.S. Pat. No. 3,842,461, dated Oct. 22, 1974; U.S. Pat. No. 3,404,776, dated Oct. 8, 1968; U.S. Pat. No. 2,772,438, dated Dec. 4, 1956; U.S. Pat. No. 3,594,848, dated July 27, 1971; German Pat. No. 631,580, dated June 24, 1936; French Pat. No. 830,876, dated May 23, 1938, among many others, show heavy duty vacuum cleaning systems for such as flat roof cleaning, road cleaning, and the like. The vacuum cleaning systems are used for various purposes, and the systems using large lines, 4 inch flexible tubes and greater, are the systems to which the invention relates. When vacuum cleaning systems are used for generally flat roofs (of the tar and gravel type) the cleaning apparatus must be capable of handling large volumes of heavy material, namely gravel and dirt, and large volumes of very fine dust. The fine dust has been deposited on such roofs as a wind born dust over the years that the roof has been in existence. When disturbed, this fine dust is easily air entrained, penetrates buildings, vehicles and all structures and areas in the vicinity of the roof being cleaned. This causes conventional cleaning methods to be extremely dirty and messy for the entire surrounding area.

The handling of dirty gravel and large volumes of dust is a major materials handling problem. Many of the vacuum systems that have been developed to handle such gravel and dust utilize enclosed containers so as to maintain a clean area in the vicinity of the roof re-roofing procedures. A majority of the prior art units are self contained units which include the vacuum system, filters and separators and container for the debris, and the transportation prime mover or truck for the unit.

The prior art devices have many different ways of containing the gravel and dust, but the most frequently used is a container mounted on a truck with an integral air pump and filtering system. All are arranged to dump the container, filled with the picked up gravel and dust. The arrangement is apparently satisfactory for many purposes, particularly for small jobs which can be completed without completely filling the single container.

Thus such arrangements are not very efficient when used on large jobs having gravel and dust loads considerably larger than the single container. This is so because the entire unit must be driven to the dump for emptying the containers. This obviously reduces working time on the roofing job itself thus providing an economic deterrent. Also, substantial capital is tied up in the truck unit having the mounted container and the vacuum equipment, since this limits the usefulness of the truck or prime mover.

SUMMARY OF THE INVENTION

The present invention provides a separable system for a vacuum cleaning arrangement, for vacuum cleaning gravel roofs and the like. The invention provides a large container for gravel and dust and includes a primary and a secondary separating arrangement attached to the container so that a separate power head, including an air pump and drive engine with a tertiary filter may be removably attached with different containers. The large container is skid mounted so that it is easily placed on a truck bed or a trailer for moving to various locations, or for transporting to a dumping area for emptying the container. The power unit for the vacuum system is preferably separate and trailer mounted, including the air pump and engine for driving the same, along with a dust filter for filtering any incoming air to the air pump. The individual containers are provided with one or more inlets for the flexible tubing used by workers for cleaning the working area, as with a vacuum cleaning head attached to the flexible tubing.

OBJECTS OF THE INVENTION

Included among the objects and advantages of the present invention is to provide a vacuum cleaning system including a separable gravel and dust container from a power unit and air pump unit.

Another object of the invention is to provide a separable container for containing gravel and dust collected by a vacuum cleaning system, which may be handled by conventional trash handling equipment.

Another object of the invention is to provide a separable gravel and dust containing unit for a vacuum cleaning system which is inexpensive and easily handled by conventional material handling equipment.

Still another object of the invention is to provide a vacuum cleaning system utilizing a separate air pump and driving means and a gravel and dust container with primary and secondary filtering means secured to the container, whereby the power system may be used for several containers, reducing the reliance on an integrated self-contained unit.

BRIEF DESCRIPTION OF THE DRAWING

These and other objects and advantages of the invention may be readily ascertained by referring to the following description and appended illustrations in which:

FIG. 6 is a top plan view of a portion of the device of FIG. 4, showing the positioning of the primary and secondary separator.

FIG. 7 is a side elevational view of a portion of a container, showing a still further modified separator system, and FIG. 8 is a side elevational view of a gravel and dust container, further modified with top mounted primary and secondary separator elements, with control of the cyclone separator collection containers for depositing recovered dust and dirt from the separators into the main container.

DESCRIPTION OF THE PREFERRED EMBODIMENT

Figure 1:
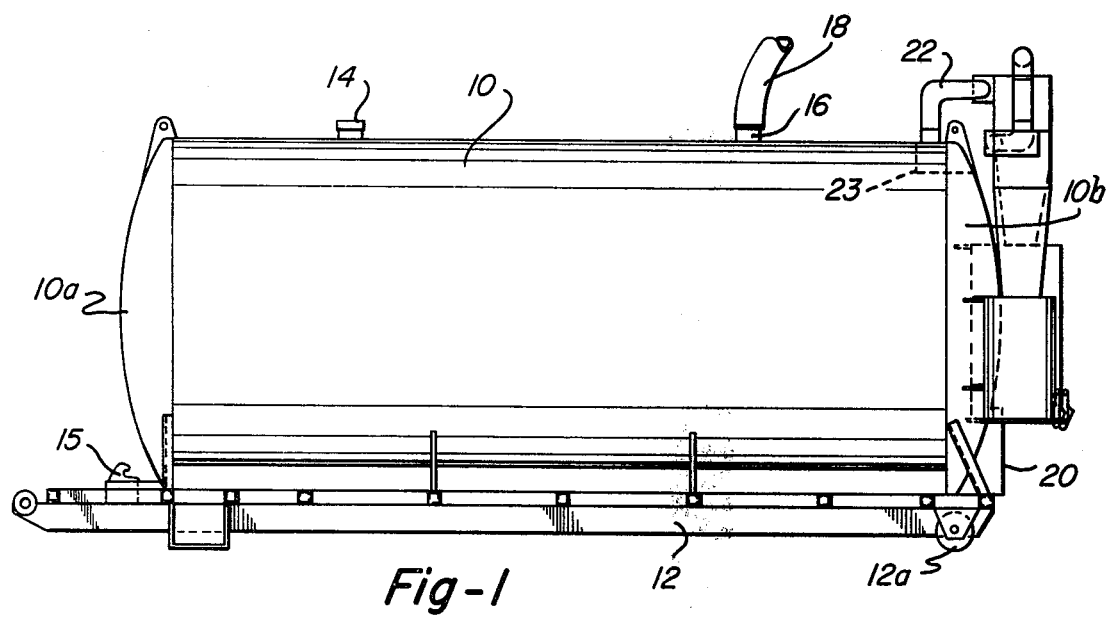
FIG. 1 is a side elevational view of one form of the invention, illustrating a large gravel container having attached primary and secondary separating units for a vacuum cleaning system.
Figure 2:
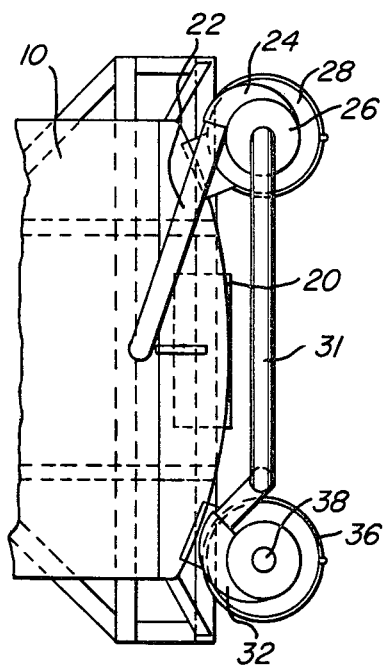
FIG. 2 is a top plan view of the primary and secondary units of the device of FIG. 1.
Figure 3:
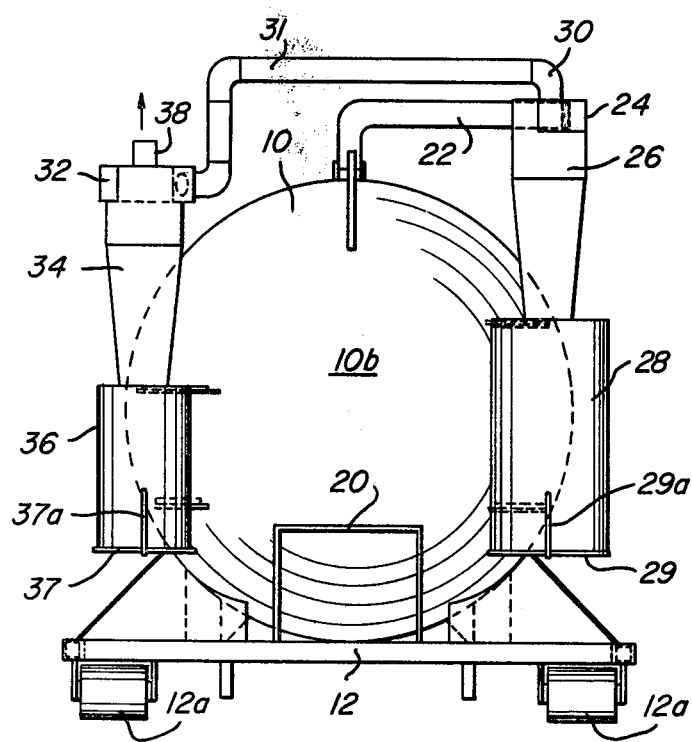
FIG. 3 is an end elevation of the device of FIG. 1.

In the embodiment illustration FIGS. 1, 2 and 3, a tank 10, having arcuate heads 10a and 10b, is arranged and mounted on a skid assembly 12, which includes rollers 12a at one end thereof. The skid assembly includes longerons, sidebraces and laterals in accordance with common practices. The skid includes a hook 15 at the end opposite the rollers 12a for holding a haul line for pulling the skid onto a truck bed or a trailer bed. The tank or container 10 is provided with an inlet 14 and an inlet 16. Both inlets are arranged to either be capped off or for connection to a flexible tube, such as flexible tube 18 (partially shown) for one and two tube operation of the unit as a vacuum cleaner. The inlets are arranged to be attached to flexible tubes, usually 4 inch flexible tubing, which is used for the vacuum cleaning process and are attached to vacuum cleaning heads as is common practice. The dished head 10b is provided with a cleanout door 20 which is arranged to be sealed so as to prevent leaking of air through the opening, but provides means for discharge of gravel, dirt, dust and the like contained in the container 10.

The tank 10 is made circular and is mounted on a skid arrangement which is adapted for use with a commercial type trash hauling unit, for example, a unit made by the Dempster Company. The tank, however, may be made rectangular with either top or bottom opening doors so that it may be handled by other types of trash hauling equipment, as for example, a Dumpster bin, also, made by the Dempster Company. In any event, the unit should be made so that it can be handled like conventional large container trash hauling equipment.

The air entering into tank 10, along with entrained gravel, dirt and dust, enters one or both of the inlets 14 and 16 depending on the use of one or two vacuum lines. The heavy material in the air is dropped into the tank 10, due to the enlarged volume of the tank which causes a reduced velocity of the air and entrained matter as it exhausts from each inlet into the tank. Air is pulled from the tank through an outlet 22 spaced from the inlet 16. The outlet is provided with a baffle 23 which prevents a direct flow from the inlet 16 into the outlet 22. The outlet 22 directs air and dust into a tangential inlet 24 of a cyclone separator 26, which is a conventional cyclone separator, and any dust and dirt centrifically discharged from the air flow falls into a closed container 28 which is attached to the bottom of cyclone 26. Generally clean air passes up the vortex outlet 30 into a transfer tube 31 which enters a tangential inlet 32 of another cyclone separator 34. This separator, also, operates in manner of a conventional cyclone separator and any solid material centrifically discharged from the airflow falls into container 36 and the exhaust air passes up through the vortex outlet 38, this air subsequently passes through a pipe, not shown, to an air pump, also not shown, which provides the motivating power for the vacuum system. The cyclone dirt container 28 is provided with a bottom door 29, controlled by a manual opening and closing handle 29a. The container 36, likewise, has a bottom outlet closure 37 which is controlled by handle 37a.

The tanks and centrifical cyclone separators are generally the least expensive part of such vacuum equipment, and it is economically advantageous to use single motivating or power units consisting of a large air pump, and most generally a gasoline or diesel engine for driving the large volume air pump with a number of containers. Furthermore, it is advantageous to provide a wet or cloth or paper filter ahead of the air pump to prevent dust from getting into the air pump. The cyclone 26 provides primary separation from air coming from the tank 10 and a larger container 28 is provided for collection of the fine dirt and dust separated from the air in the cyclone. The cyclone 34 provides a secondary separator of the air and a smaller tank is necessary. When the unit is transported to a dumping area the containers 28 and 36 are opened manually to empty them, and then door 20 is opened. By elevating the opposite end of the tank, the contents of the tank 10 may be discharged. Since several of these tank units may be necessary on a particular job, the prime mover may be transferred from a filled tank to the empty tank at the job site. The cleaning of the roof is continued. Of course, the vacuum lines for attachment to the tanks inlets are transferred from the full tank to the empty tank. Thus, with several of the tanks at the job location the work of cleaning the roof may be continued even though transportation for the filled unit is not available at the time it is initially filled.

Figure 4:
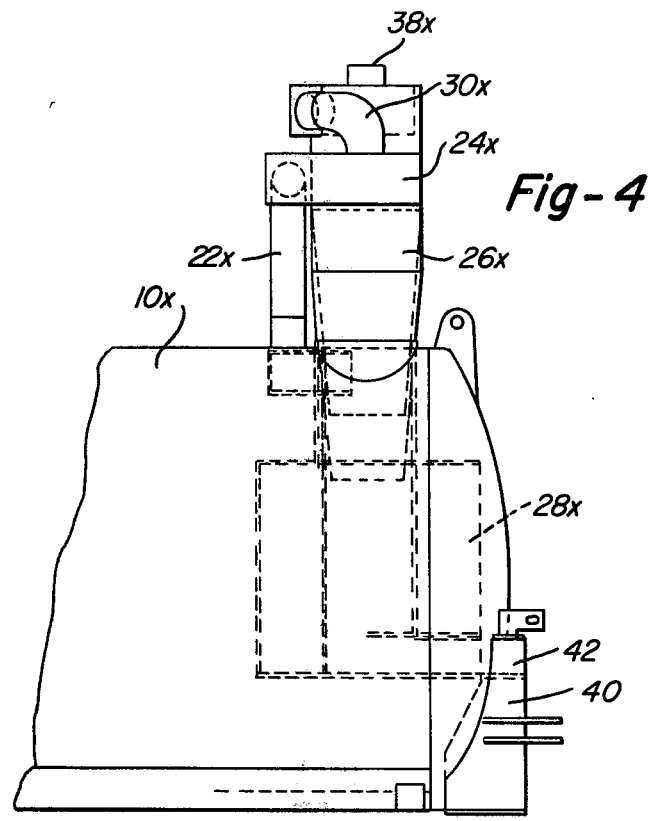
FIG. 4 is a side elevational view of a portion of a modified tank with the primary and secondary separator mounted with their collection chambers internal of the single container.
Figure 5:
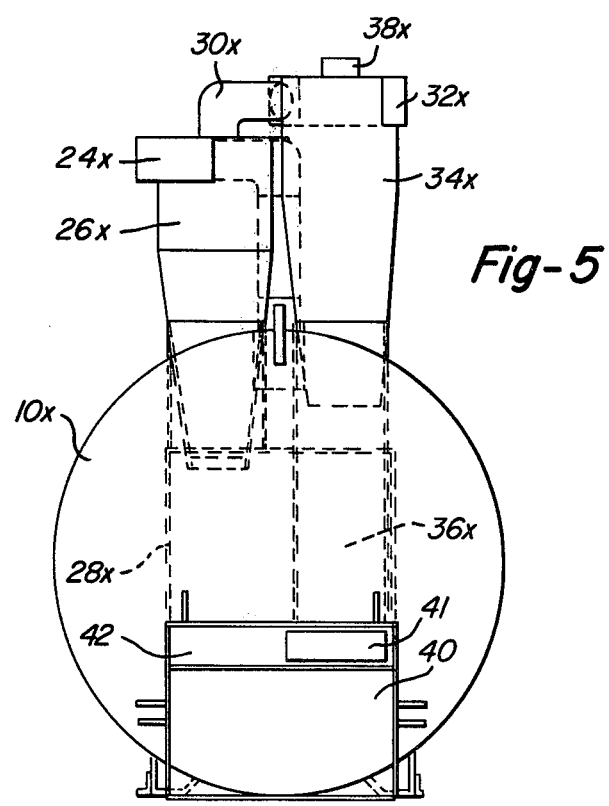
FIG. 5 is an end elevational view of the device of FIG. 4.

By integrating the cyclone separators and their dust containers inside the main tank, this auxiliary equipment may be protected from damage by being mounted mostly inside of the main tank. For this purpose FIGS. 4 and 5 illustrate a modification wherein the only external portions of the separators are upper portions at the top of the tank. A primary separator 26x receives a tangential flow of air from the tangential inlet 24x from the outlet 22x of the tank 10x, and solid material separated by the cyclone is exhausted into container 28x which is mounted internally of the tank 10x. A vortex outlet 30x is introduced into tangential inlet 32x to a secondary cyclone separator 34x. This cyclone discharges solid material into container 36x which is adjacent to, but separated from the container 28x inside the main tank. A vortex outlet 38x provides an exhaust for the vortex of air coming up the cyclone separator which is releasably connected to the air pump for providing motivating power for the vacuum system. The tank 10x is provided with a bottom opening door 40 on one head which include upper sections 41 and 42 which close and seal the internal tanks 36x and 28x respectively. The doors are provided with a peripheral sealant strip so as to seal the containers one from the other, and to prevent the entry of air in or out of the tanks when the doors are closed. Thus, when the unit is in the dumping position, opening the door 40 simultaneously opens the doors 41 and 42 and all three containers are emptied at the same time. With the only small portion of the cyclones extending beyond the tank 10x in the upper part of the unit there is less danger of the cyclones being damaged by handling. This is especially so as the cyclones are on top of the tank.

In some instances, it may be advantageous to provide the primary cyclone separator solid matter deposited directly into the main tank with the air discharge from the first vortex passing into a secondary separator. The secondary air separator or cyclone normally discharges fine dust. Therefore, the unit is useful when it is desired to re-use the gravel, since the unit removes the fine dust. As shown in FIG. 7, a tank 10y is provided with a cyclone separator 50 having tangential inlet 51 arranged to be attached to a loading line 52, which is the flexible hose leading to the vacuum head, and the cyclone discharges directly into the tank 10y through an outlet 53.

The cyclone 50 provides for a primary separation of large particles, such as gravel, etc. directly into the tank 10. The cyclone 50 provides an additional separation to the separation achieved when a small line enters a large volume. A vortex exhaust 54 from the cyclone 50 is passed through a line 55 into the inlet line 56 of a tangential inlet 57 and cyclone 58. The cyclone 58 is mounted to discharge its solid material into an external tank 59 having a manually operated door 60, controlled by a handle 61. A vortex exhaust 62 passes through a line (not shown) into the primary air pump. In some instances, it might be desirable to add an additional cyclone separator similar to the arrangement of FIGS. 1-3 so that in effect there are three cyclones for the air line.

In another modification of the unit, shown in FIG. 8, arranged with an outlet having a sealed door in the manner described above, also, which may be mounted on a skid or wheels as desired, is provided with a pair of inlets 71 and 72. The inlets exhausting into a larger volume provides an initial separation of the solid material from air due to the change in velocity of the air stream. Air exhausts from the tank 70 through an outlet 73 which enters a tangential inlet 74 to a cyclone 75. A vortex outlet 76 passes into a tangential inlet 77 of a cyclone 78, and this cyclone is provided with a vortex outlet 79 which is arranged for attachment to an airpump (not shown). The two cyclones are provided with cone valves at the solid outlet, providing means for sealing the cyclones from the tank 70 during operation and for discharging solid materials from the cyclone into the tank 70. For this purpose, cyclone 75, for example, includes a cone valve 80 in the upper portion of its discharge and a cone valve 81 in the lower part of its discharge. The cyclone 78 is provided with a cone valve 82 in the upper part thereof and a cone valve 83 in the lower part thereof. By cycling the cone valve in open and closed positions, the cyclones may be discharged into the tank 70. For example, the cyclone 75 may be discharged by initially closing cone valve 81 and opening cone valve 80, which permits solid material spun out of the air stream to pass from the cyclone into the space between the two cone valves. By closing the cone valve 80 and opening the valve 81, solid material flows from that material into the space, and the cyclone 75 maintains its seal from the tank 70. In a similar manner, the cone valves 82 and 83 provide for discharge material from the cyclone 78. These cone valves may be placed on a timing arrangement so that they operated periodically and frequently to maintain the cyclones in generally empty condition and permit the separated solid material to discharge into the tank 70. Thus all solid material removed from the air may be discharged from the single tank 70.

What is claimed is:

1. A container and separator assembly for a vacuum cleaning system constructed and arranged for releasable connection to a separable airpump and drive and releasable connection to flexible vacuum tubes, comprising:
   (a) an enclosed container constructed and arranged for handling by conventional trash handling means, and having a lower door for removal of content by tilting the container including airtight seal means for said lower door, and having inlet means for releasable connection to flexible vacuum tubes, and an outlet;
   (b) at least two series connected cyclone separators for cleaning air passing out of said container outlet mounted on said container;
   (c) passage means from said container outlet to the upstream one of said at least two series connected cyclone separators for passing air;
   (d) storage means including separate containers for each of said at least two cyclone separators for accumulating solid matter removed by said at least two cyclone separators;
   (e) means for emptying said storage means; and
   (f) air outlet means from the downstream one of said at least two cyclone separators, and said air outlet means has means for releasable attachment to airpump means.

2. A container and separator assembly according to claim 1, wherein:
   said container is cylindrical having attached heads, and is skid mounted.

3. A container and separator assembly according to claim 1, wherein:
   said at least two cyclone separators are externally mounted on said container, and said storage means for each of said at least two separators is externally of said container.

4. A container and separator assembly according to claim 1, wherein:
   said at least two cyclone separators are mounted on said container; the first of said at least two separators being mounted such that its solid exhaust outlet is positioned internally of said container, and it has a tangential inlet which is connectable to a flexible vacuum tube and an air outlet, the other of said at least two cyclone separators being connected exteriorly of said container and having an externally positioned storage means.

5. A container and separator assembly according to claim 1, wherein:
   said at least two cyclone separators are mounted on said container and said storage means for each of said at least two separators is mounted internally of said container, and further including lock means arranged in said storage means for periodically removing matter from each of said at least two separators while maintaining it sealed from said container, whereby to deposit solid matter from said at least two separators into said container.

6. A container and separator assembly according to claim 5, wherein:
   said storage means for each of said at least two cyclone separators is positioned such that said storage means are closed by a portion of said sealable door of said container for simultaneous opening of said container and said storage means.

7. A container and separator assembly according to claim 1, wherein:
   said at least two cyclone separators are permanently attached to said container.

* * * * *

REEXAMINATION CERTIFICATE (77th)

United States Patent [19]

Mekelburg

[11] B1 4,162,149

[45] Certificate Issued Apr. 26, 1983

[54] GRAVEL AND DUST SEPARATOR AND CONTAINER FOR VACUUM CLEANING SYSTEMS

[75] Inventor: Clayton G. Mekelburg, Englewood, Colo.

[73] Assignee: Rent-A-Vac International Ltd., Denver, Colo.

Reexamination Request
No. 90/000,172, Mar. 1, 1982

Reexamination Certificate for:
Patent No.: 4,162,149
Issued: Jul. 24, 1979
Appl. No.: 866,809
Filed: Jan. 3, 1978

[51] Int. Cl.³ .............................. B01D 50/00; B01D 45/12; B01D 45/00; E01H 1/08
[52] U.S. Cl. ............ 55/315; 55/349; 55/356; 15/340
[58] Field of Search .......................................... None.
[56] References Cited

U.S. PATENT DOCUMENTS

| | | | |
|---|---|---|---|
| 1,944,976 | 1/1934 | Hamilton | 183/51 |
| 2,760,595 | 8/1956 | Pynor | 55/342 |
| 2,966,232 | 12/1960 | Austin | 55/345 |
| 3,189,286 | 6/1965 | O'Connor | 241/186 |
| 3,257,798 | 6/1966 | Hass | 5/345 |
| 3,404,776 | 10/1968 | Shaddock | 55/314 |
| 3,421,666 | 1/1969 | Lawson | 55/342 |
| 3,608,283 | 9/1971 | Huglo | 55/356 |
| 3,717,901 | 2/1973 | Johnstone | 15/314 |
| 3,780,502 | 12/1973 | Dupre et al. | 55/356 |
| 3,842,461 | 10/1974 | Wurster | 55/319 |
| 3,870,489 | 3/1975 | Shaddock | 55/319 |
| 3,955,236 | 5/1976 | Mekelburg | 55/319 |
| 4,062,664 | 12/1977 | Dupre | 55/319 |
| 4,133,658 | 1/1979 | Callewyn | 55/315 |

FOREIGN PATENT DOCUMENTS

| | | |
|---|---|---|
| 379989 | 4/1940 | Italy. |
| 535360 | 4/1941 | United Kingdom. |

*Primary Examiner*—Bernard Nozick

[57] ABSTRACT

An enclosed portable container for gravel and dust in a vacuum cleaning system, provided with at least two cyclone air cleaners, having a clean out door, and each cyclone is provided with its own clean out door, is skid mounted for pick up and carry to dumping areas, reducing the handling of collected dirt, gravel and dust. The separate air pump assembly provides motivating power for the vacuum cleaning system.

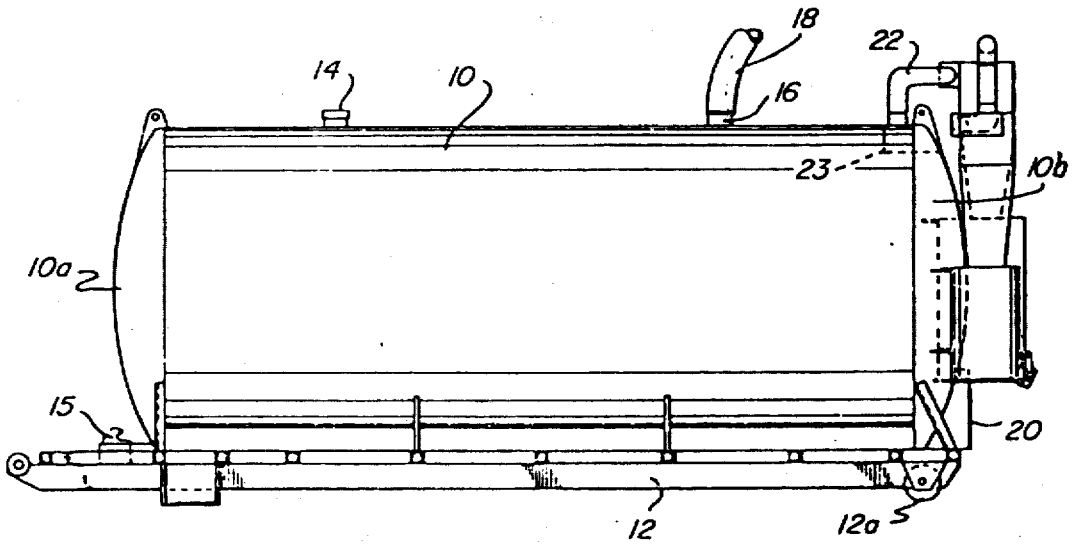

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–7 is confirmed.

* * * * *